Lovejoy & Butterfield,
Grinding and Polishing Metal.
N° 18,509. Patented Oct. 27, 1857.
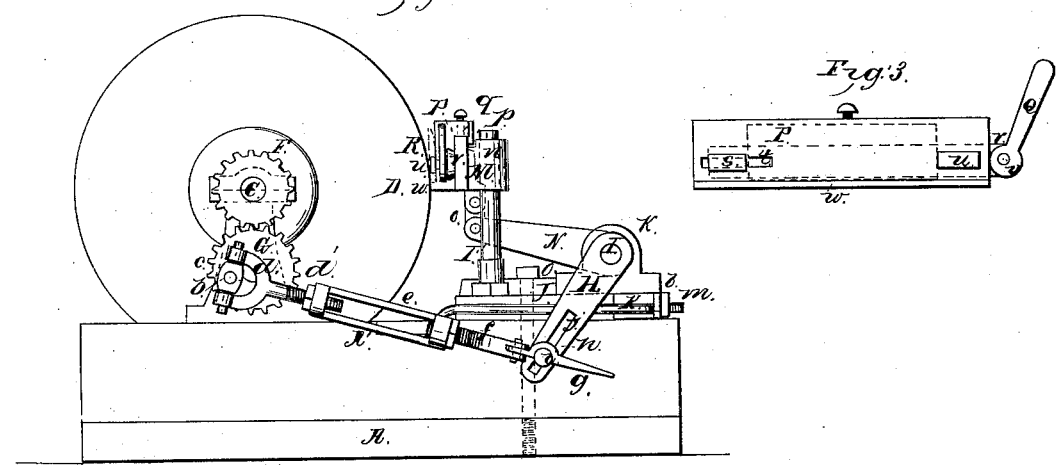
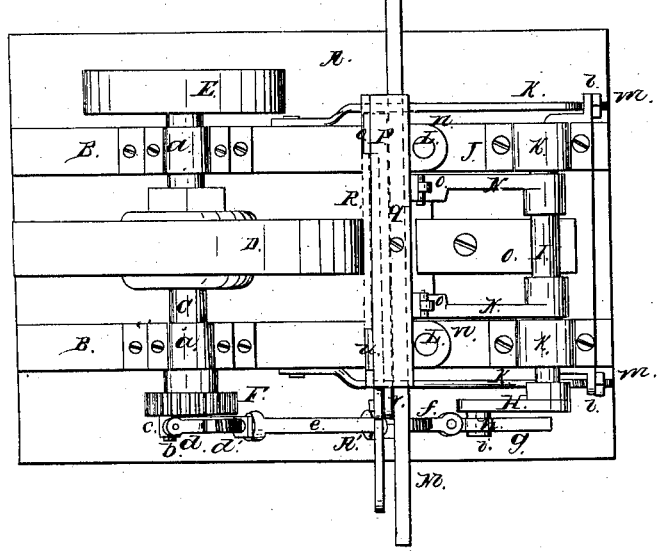

UNITED STATES PATENT OFFICE.

DANIEL LOVEJOY AND GEO. F. BUTTERFIELD, OF LOWELL, MASSACHUSETTS.

GRINDING AND POLISHING MACHINE.

Specification of Letters Patent No. 18,509, dated October 27, 1857.

*To all whom it may concern:*

Be it known that we, DANIEL LOVEJOY and GEORGE F. BUTTERFIELD, of Lowell, in the county of Middlesex and State of Massachusetts, have invented a new and Improved Machine for Grinding and Polishing Metal Plates, Knives, and other Articles having Plane Surfaces; and we do hereby declare that the following is a full, clear, and exact description of the same, reference being had to the annexed drawings, making a part of this specification, in which—

Figure 1, is a side view of our improvement. Fig. 2, is a plan or top view of the same. Fig. 3, is a detached face view of the sliding bed and clamp.

Similar letters of reference indicate corresponding parts in the several figures.

The object of this invention is to expedite the process of grinding and polishing metal plates and articles having plane surfaces, and also to insure the work being perfectly done.

The invention consists in giving the plate, or other article to be ground or polished a reciprocating vertical movement in a plane tangential with the grinding stone or wheel, and at the same time a lateral vibrating movement whereby the above mentioned object is attained.

To enable those skilled in the art to fully understand and construct our invention we will proceed to describe it.

A represents a bed or platform having two parallel beams B, B, secured upon it, on which the bearing (*a*) (*a*) of a shaft C are secured. On the shaft C a grind stone or grinding wheel D is secured, said shaft having a pulley E at one end and a pinion F at the opposite end. The pinion F gears into a pinion G the axis of which is attached to the upright of one of the bearings (*a*). The pinion G has what is technically termed an "odd tooth," or it has one or more teeth than the pinion F, an excess of one tooth is sufficient and perhaps preferable, the number of teeth on the respective pinions may be varied, but it is designed to have the pinion F provided with one less tooth than the pinion G. The pinion G has a crank pin attached to it, and an arm (*c*) is fitted on said pin, the pin passing through the center of the arm which is allowed to work or turn freely upon it, a fork (*d*) is connected by pivots (*e*) to the ends of the arm (*c*), said fork being connected with a screw rod (*d'*) which passes into one end of a link (*e*) said link having a screw rod (*f*) connected with its opposite end. The outer end of the screw rod (*f*) is pivoted to a rod (*g*) which is provided with a hook (*h*) which is fitted over a pin (*i*) secured in a slot (*j*) in an arm H, the above parts forming a connecting rod A'. The arm H is placed on one end of a shaft I which is fitted in bearings (*k*) (*k*) attached to a rectangular frame J, which is placed on the beams B, B, and which may be adjusted thereon nearer to or farther from the stone or wheel D by means of screw rods K, K, which are attached to the beams B, B, one to each and pass through eyes (*l*) attached to the outer end of the frame, each rod K having a nut (*m*) on its outer end, by turning which the frame may be adjusted as described. To the inner end of the frame J vertical rods L are attached, one at each side and M is a horizontal bar having two eyes (*n*) (*n*) on its outer side through which the rods L, L, pass. The bar M is connected by two links (*o*) (*o*) with arms N, N, which are attached to the shaft I. The frame J is secured upon the beams B, B, by a clamp O.

P is a bed plate of rectangular form and having a flange (*p*) attached to and extending a short distance below a projecting plate (*q*) attached to the upper end of the bed. This flange in consequence of being attached to the plate (*q*) as described forms a guide or groove by which the bed plate may be attached to the bar M, the upper edge of said bar fitting in the groove, see Fig. 1. A sliding bar (*r*) is fitted in the back or outer side of the bed plate P, said bar having a projection (*s*) attached to it which projection passes through an oblong slot (*t*) in the bed plate P. A stationary projection (*u*) is attached to the face side of the bed plate P, said projection being in line with the projection (*s*) on the bar (*r*). The bar (*r*) is operated by a cam (*v*) at the inner end of a lever Q which is attached to one end of bar (*r*). The lower edge of the bed plate P is provided with a ledge (*w*) to sustain the plate R, to be ground, said plate, shown in red, being clamped between the two projections (*s*), (*u*).

The operation is as follows: The plate knife cutter or other article to be ground and polished is clamped to the bed plate P, and said bed plate placed on the bar M, and the frame J is adjusted so that the plate, knife, or other article may be brought in contact with the stone or wheel D by turning the nuts (*m*), the crank O being previously relaxed. The hook (*h*) of the rod (*g*) is then placed over the pin (*i*) and motion being given the shaft C the stone or wheel D will be rotated, and a vertical reciprocating motion will be given the bar M and the plate or knife R will be moved up and down tangentially with the stone or wheel by means of the arms N, N, H, crank pinion G, and connecting rod A′ formed of the screw rods (*d′*) (*f*) link (*e*) and rod (*g*), and the bed plate P is at the same time moved laterally either by hand or otherwise so that the plate or knife will be ground in an even manner or with a plane surface and in a very expeditious manner.

By having the pinion G provided with an odd tooth as previously stated, or a few more teeth than the pinion F the relative position of the plate or knife R is continually changing with respect to the stone or wheel and the stone or wheel is consequently made to wear circular or true, or is prevented from getting out of a circular form. The connecting rod may be shortened or lengthened at any time by screwing up or unscrewing the rods (*d′*) (*f*), and if required the frame J may be placed more or less obliquely with the stone and even perfectly parallel therewith without affecting the operation of the plate or knife R in consequence of the universal joint attachment of the connecting rod with the pinion G.

This machine has been practically tested and operates rapidly and well. It grinds and polishes articles so as to leave a perfectly even or plane surface on them.

Having thus described our invention what we claim as new and desire to secure by Letters Patent, is,

Giving the plate R, or other article to be ground a vertical reciprocating motion tangentially with the plane of motion of the stone or wheel D, or parallel therewith and also a vibrating lateral motion for the purpose set forth.

DANIEL LOVEJOY.
GEO. F. BUTTERFIELD.

Witnesses:
M. G. Howe,
Y. C. Abbott.